United States Patent
Rotter et al.

(10) Patent No.: US 8,052,780 B2
(45) Date of Patent: Nov. 8, 2011

(54) AIR CLEANER ASSEMBLY

(75) Inventors: Terrence M. Rotter, Sheboygan Falls, WI (US); Kevin G. Bonde, Kiel, WI (US); William D. Koenigs, Fond du Lac, WI (US); Shaoping Wang, Madison, WI (US)

(73) Assignee: Kohler Co., Kohler, WI (US)

( * ) Notice: Subject to any disclaimer, the term of this patent is extended or adjusted under 35 U.S.C. 154(b) by 910 days.

(21) Appl. No.: 11/548,912

(22) Filed: Oct. 12, 2006

(65) Prior Publication Data

US 2007/0079794 A1    Apr. 12, 2007

Related U.S. Application Data

(60) Provisional application No. 60/726,309, filed on Oct. 12, 2005.

(51) Int. Cl.
*B01D 46/00* (2006.01)
(52) U.S. Cl. ............... 95/273; 55/218; 55/283; 55/502; 55/514; 55/DIG. 28; 123/198 E
(58) Field of Classification Search ............... 95/273; 55/218, 283, 383.5, 492, 502, 503, 504, 505, 55/506, 514, DIG. 28; 123/198 E
See application file for complete search history.

(56) References Cited

U.S. PATENT DOCUMENTS

| | | | |
|---|---|---|---|
| 2,080,574 A | 5/1937 | McCoy | |
| 2,962,121 A | 11/1960 | Wilber | |
| 3,013,628 A | 12/1961 | Jacobs et al. | |
| 3,048,959 A | 8/1962 | Lowther | |
| 3,078,650 A | 2/1963 | Anderson et al. | |
| 3,147,100 A | 9/1964 | Wilber | |
| 3,169,844 A | 2/1965 | Young | |
| 3,201,927 A | 8/1965 | Wachter | |
| 3,319,404 A | 5/1967 | Lowther | |

(Continued)

FOREIGN PATENT DOCUMENTS

AT    0077968 U1    3/2004

(Continued)

OTHER PUBLICATIONS

Mann + Hummel's High Performance Air Cleaner Gives the Mercury Marauder a Boost in Performance; Advanced Materials & Composites News, May 2002; n539; Monday, May 20, 2002; http://dialogpro.dialog.com.

(Continued)

*Primary Examiner* — Jason M Greene
*Assistant Examiner* — Karla Hawkins

(57) ABSTRACT

In at least some embodiments, the present invention relates to an air cleaner having a housing portion, and a low profile rain cover having an opening on an underside of the cover to allow unfiltered air to enter into the air cleaner. Also, in at least some embodiments, the present invention relates to an air cleaner including a housing and an additional component by which the air cleaner is capable of being directly coupled to a carburetor inlet. In some such embodiments, one or more protrusions can be provided within a channel formed by the housing/additional component to influence air flow. Further, in at least some embodiments, the present invention relates to an air cleaner having a shaped wall formed on a housing portion, where the shaped wall includes both an interior surface and an exterior surface by which air flowing within the air cleaner is imparted with helical motion.

14 Claims, 10 Drawing Sheets

U.S. PATENT DOCUMENTS

| | | | |
|---|---|---|---|
| 3,429,108 A | 2/1969 | Larson | |
| 3,617,149 A | 11/1971 | Gibson | |
| 3,618,578 A | 11/1971 | Swantman et al. | |
| 3,672,130 A | 6/1972 | Sullivan et al. | |
| 3,680,286 A | 8/1972 | Nostrand | |
| 3,698,161 A | 10/1972 | Brixius et al. | |
| 3,730,158 A | 5/1973 | Amand | |
| 3,745,753 A | 7/1973 | Risse | |
| 3,816,982 A | 6/1974 | Regnault | |
| 3,832,122 A | 8/1974 | La Haye et al. | |
| 3,849,093 A | 11/1974 | Konishi | |
| 3,853,518 A | 12/1974 | Tu et al. | |
| 3,868,819 A | 3/1975 | Knapp | |
| 3,884,658 A | 5/1975 | Roach | |
| 3,907,529 A | 9/1975 | Borsheim | |
| 3,920,426 A | 11/1975 | Tu et al. | |
| 3,925,044 A | 12/1975 | Tu et al. | |
| 3,928,007 A | 12/1975 | Jackson | |
| 3,966,014 A | 6/1976 | Gowing | |
| 4,006,000 A | 2/1977 | Tortorici et al. | |
| 4,038,051 A | 7/1977 | Ide | |
| 4,133,847 A | 1/1979 | Feuerman | |
| 4,135,899 A | 1/1979 | Gauer | |
| 4,168,686 A | 9/1979 | Wakita et al. | |
| 4,197,101 A | 4/1980 | Cote, Jr. | |
| 4,197,102 A | 4/1980 | Decker | |
| 4,222,755 A | 9/1980 | Grotto | |
| 4,227,898 A | 10/1980 | Kamekawa et al. | |
| 4,233,043 A | 11/1980 | Catterson | |
| 4,235,609 A | 11/1980 | Garigioli | |
| 4,242,115 A | 12/1980 | Harold et al. | |
| 4,243,397 A | 1/1981 | Tokar et al. | |
| 4,261,710 A | 4/1981 | Sullivan | |
| 4,278,455 A | 7/1981 | Nardi | |
| 4,331,459 A | 5/1982 | Copley | |
| 4,342,576 A | 8/1982 | Seki et al. | |
| 4,350,509 A | 9/1982 | Alseth et al. | |
| 4,388,091 A | 6/1983 | Khosropour | |
| 4,396,407 A | 8/1983 | Reese | |
| 4,440,555 A | 4/1984 | Chichester | |
| 4,460,390 A | 7/1984 | Alseth et al. | |
| 4,482,365 A * | 11/1984 | Roach | 96/408 |
| 4,482,368 A | 11/1984 | Roberts | |
| 4,491,460 A | 1/1985 | Tokar | |
| 4,548,166 A | 10/1985 | Gest | |
| 4,592,316 A | 6/1986 | Shiratsuchi | |
| 4,619,677 A | 10/1986 | Matheson et al. | |
| 4,653,457 A | 3/1987 | Stege | |
| 4,664,684 A | 5/1987 | Dunn et al. | |
| 4,681,608 A | 7/1987 | Nagashima | |
| 4,720,292 A | 1/1988 | Engel et al. | |
| 4,758,256 A | 7/1988 | Machado | |
| 4,759,783 A | 7/1988 | Machado | |
| 4,790,864 A | 12/1988 | Kostun | |
| 4,806,135 A | 2/1989 | Siposs | |
| 4,813,385 A | 3/1989 | Yamaguchi et al. | |
| 4,838,901 A | 6/1989 | Schmidt et al. | |
| RE33,085 E | 10/1989 | Petersen | |
| 4,871,381 A | 10/1989 | Smith | |
| 4,897,097 A | 1/1990 | Yamamura | |
| 4,950,317 A | 8/1990 | Dottermans | |
| 4,969,937 A | 11/1990 | Tassicker | |
| 5,013,182 A | 5/1991 | Coulvonvaux et al. | |
| 5,022,903 A | 6/1991 | Decker | |
| 5,030,264 A | 7/1991 | Klotz | |
| 5,059,221 A | 10/1991 | McWilliam | |
| 5,082,476 A | 1/1992 | Kahlbaugh et al. | |
| 5,106,397 A | 4/1992 | Jaroszczyk | |
| 5,120,334 A | 6/1992 | Cooper | |
| 5,120,337 A | 6/1992 | Benzler | |
| 5,125,940 A | 6/1992 | Stanhope | |
| 5,137,557 A | 8/1992 | Behrendt et al. | |
| 5,160,519 A | 11/1992 | Svensson et al. | |
| 5,167,683 A | 12/1992 | Behrendt | |
| 5,171,342 A | 12/1992 | Trefz | |
| 5,197,282 A | 3/1993 | Kume | |
| 5,213,596 A | 5/1993 | Kume | |
| 5,277,157 A | 1/1994 | Teich | |
| 5,352,256 A | 10/1994 | Stead et al. | |
| 5,408,977 A | 4/1995 | Cotton | |
| 5,449,391 A | 9/1995 | Decker | |
| 5,472,463 A | 12/1995 | Herman et al. | |
| 5,472,464 A | 12/1995 | Mochida | |
| 5,477,819 A | 12/1995 | Kopec | |
| 5,494,497 A | 2/1996 | Lee | |
| 5,505,756 A | 4/1996 | Decker | |
| 5,545,241 A | 8/1996 | Vanderauwera et al. | |
| 5,547,480 A | 8/1996 | Coulonvaux | |
| 5,553,587 A | 9/1996 | Conoscenti | |
| 5,556,440 A | 9/1996 | Mullins et al. | |
| 5,575,247 A | 11/1996 | Nakayama | |
| 5,609,658 A | 3/1997 | Takemura et al. | |
| 5,622,537 A | 4/1997 | Kahlbaugh et al. | |
| 5,632,243 A | 5/1997 | Buchholz | |
| 5,674,603 A | 10/1997 | Stiles | |
| 5,713,323 A | 2/1998 | Walsh | |
| 5,725,624 A | 3/1998 | Ernst et al. | |
| 5,730,769 A | 3/1998 | Dungs | |
| 5,755,095 A | 5/1998 | Maurer | |
| 5,755,842 A | 5/1998 | Patel | |
| 5,755,843 A | 5/1998 | Sundquist | |
| 5,769,045 A | 6/1998 | Edwards | |
| 5,779,900 A | 7/1998 | Holm et al. | |
| 5,800,581 A | 9/1998 | Gielink | |
| 5,813,384 A | 9/1998 | Lavender et al. | |
| D401,306 S | 11/1998 | Ward et al. | |
| 5,858,224 A | 1/1999 | Schwandt et al. | |
| 5,863,313 A | 1/1999 | Coulonvaux | |
| 5,865,863 A | 2/1999 | DeSousa | |
| D407,475 S | 3/1999 | Coulonvaux et al. | |
| 5,882,367 A | 3/1999 | Morgan et al. | |
| 5,893,937 A * | 4/1999 | Moessinger | 55/385.3 |
| 5,897,676 A | 4/1999 | Engel | |
| 5,918,576 A | 7/1999 | Ohoka et al. | |
| 5,921,214 A | 7/1999 | Fujita | |
| D412,567 S | 8/1999 | Ward et al. | |
| 5,951,729 A | 9/1999 | Ernst et al. | |
| 5,954,577 A | 9/1999 | Meckler | |
| D416,317 S | 11/1999 | Bellil et al. | |
| 5,980,618 A | 11/1999 | Holzmann et al. | |
| 5,983,632 A | 11/1999 | Fujita et al. | |
| D421,110 S | 2/2000 | Coulonvaux et al. | |
| 6,022,055 A | 2/2000 | Coulonvaux et al. | |
| 6,026,768 A | 2/2000 | Spitler | |
| D422,069 S | 3/2000 | Decker | |
| 6,039,778 A | 3/2000 | Coulonvaux | |
| 6,044,811 A | 4/2000 | Kouchi et al. | |
| 6,051,042 A | 4/2000 | Coulonvaux | |
| 6,071,370 A | 6/2000 | Stiles | |
| 6,085,915 A | 7/2000 | Schwandt et al. | |
| 6,096,108 A | 8/2000 | Coulonvaux | |
| 6,098,586 A | 8/2000 | Bloomer | |
| 6,139,607 A | 10/2000 | Coulonvaux | |
| 6,149,700 A | 11/2000 | Morgan et al. | |
| 6,167,862 B1 | 1/2001 | Powell | |
| 6,171,355 B1 | 1/2001 | Gieseke | |
| 6,179,890 B1 | 1/2001 | Ramos | |
| 6,183,544 B1 | 2/2001 | Ormond et al. | |
| 6,187,073 B1 | 2/2001 | Gieseke | |
| 6,196,203 B1 | 3/2001 | Grieve | |
| D440,645 S | 4/2001 | Coulonvaux et al. | |
| 6,216,453 B1 | 4/2001 | Maurer | |
| 6,217,627 B1 | 4/2001 | Vyskocil | |
| 6,220,020 B1 | 4/2001 | Takahashi | |
| 6,231,630 B1 | 5/2001 | Ernst | |
| 6,234,132 B1 | 5/2001 | Kopec et al. | |
| 6,235,073 B1 | 5/2001 | Banister et al. | |
| 6,251,150 B1 | 6/2001 | Small et al. | |
| 6,251,151 B1 | 6/2001 | Kobayashi et al. | |
| 6,261,334 B1 | 7/2001 | Morgan et al. | |
| 6,264,712 B1 | 7/2001 | Decker | |
| 6,286,471 B1 | 9/2001 | Powell | |
| 6,290,739 B1 | 9/2001 | Gieseke et al. | |
| 6,306,192 B1 | 10/2001 | Greif et al. | |
| 6,306,193 B1 | 10/2001 | Morgan et al. | |
| 6,311,483 B1 | 11/2001 | Hori | |
| 6,312,491 B2 | 11/2001 | Coulonvaux | |

| | | |
|---|---|---|
| 6,334,887 B1 | 1/2002 | Coulonvaux |
| 6,340,011 B1 | 1/2002 | Jainek |
| 6,340,375 B1 | 1/2002 | DePietro, III |
| 6,361,574 B1 | 3/2002 | Decker |
| 6,383,243 B1 | 5/2002 | Yoder |
| 6,383,244 B1 | 5/2002 | Wake et al. |
| 6,391,076 B1 | 5/2002 | Jaroszczyk et al. |
| 6,395,048 B1 | 5/2002 | Yoder |
| 6,398,832 B2 | 6/2002 | Morgan et al. |
| 6,401,961 B1 | 6/2002 | Butler |
| 6,402,798 B1 | 6/2002 | Kallsen et al. |
| 6,409,786 B1 | 6/2002 | Wright et al. |
| 6,413,289 B2 | 7/2002 | Engel et al. |
| 6,416,561 B1 | 7/2002 | Kallsen et al. |
| 6,416,563 B1 | 7/2002 | Wright et al. |
| 6,419,718 B1 | 7/2002 | Klug |
| 6,425,930 B1 | 7/2002 | Wake |
| 6,427,364 B1 | 8/2002 | Heismann et al. |
| 6,436,162 B1 | 8/2002 | Wake |
| 6,474,284 B1 | 11/2002 | Baumann et al. |
| D467,654 S | 12/2002 | Klug et al. |
| 6,517,595 B2 | 2/2003 | Kino |
| 6,540,801 B2 | 4/2003 | Gieseke |
| 6,547,857 B2 | 4/2003 | Gieseke et al. |
| 6,564,766 B2 | 5/2003 | Ayton |
| 6,592,655 B2 | 7/2003 | Iriyama |
| 6,599,342 B2 | 7/2003 | Andress et al. |
| 6,602,308 B1 | 8/2003 | Carle |
| 6,610,117 B2 | 8/2003 | Gieseke |
| 6,638,332 B1 | 10/2003 | Schmitz et al. |
| 6,641,636 B2 | 11/2003 | Willig et al. |
| 6,641,637 B2 | 11/2003 | Kallsen et al. |
| 6,663,685 B2 | 12/2003 | Wright et al. |
| 6,673,136 B2 | 1/2004 | Gillingham |
| 6,681,726 B2 | 1/2004 | Linsbauer et al. |
| 6,691,662 B2 | 2/2004 | Pontoppidan |
| 6,726,742 B2 | 4/2004 | Arden |
| D492,759 S | 7/2004 | Yoshida |
| 6,758,186 B2 | 7/2004 | Janoske |
| 6,789,385 B2 | 9/2004 | Glover |
| 6,792,925 B2 | 9/2004 | Dworatzek et al. |
| 6,805,088 B2 | 10/2004 | Tachibana |
| 6,814,772 B1 | 11/2004 | Wake et al. |
| 6,829,804 B2 | 12/2004 | Sepke |
| 6,852,148 B2 | 2/2005 | Gieseke et al. |
| 6,862,885 B1 | 3/2005 | Mitchell |
| 6,878,189 B2 | 4/2005 | Moredock |
| 6,890,375 B2 | 5/2005 | Huber |
| 6,991,664 B2 | 1/2006 | Riehmann et al. |
| 7,004,987 B2 | 2/2006 | Pikesh et al. |
| 7,028,463 B2 | 4/2006 | Hammond et al. |
| D520,619 S | 5/2006 | Kuempel et al. |
| 7,077,078 B2 | 7/2006 | Yuasa |
| 7,080,621 B2 | 7/2006 | Nakamizo |
| 7,150,485 B2 | 12/2006 | Wirges et al. |
| 7,159,577 B2 | 1/2007 | Haskew et al. |
| 7,165,536 B2 | 1/2007 | Kirk et al. |
| 7,182,804 B2 | 2/2007 | Gieseke et al. |
| D540,819 S | 4/2007 | Schmitt et al. |
| D540,929 S | 4/2007 | Kowis |
| 7,197,869 B2 | 4/2007 | Kokubo et al. |
| 7,201,155 B2 | 4/2007 | Mills |
| 7,213,581 B2 | 5/2007 | Burke et al. |
| 7,267,112 B2 | 9/2007 | Donahue et al. |
| D555,775 S | 11/2007 | Bonde et al. |
| 7,290,533 B2 | 11/2007 | Tsuruta |
| 7,364,601 B2 | 4/2008 | Xu et al. |
| 7,392,770 B2 | 7/2008 | Xiao |
| 7,438,059 B2 | 10/2008 | Mills et al. |
| 7,516,611 B2 | 4/2009 | Wassmur |
| 2002/0059867 A1 | 5/2002 | Gieseke |
| 2004/0134171 A1 | 7/2004 | Scott |
| 2005/0193694 A1 | 9/2005 | Gieseke et al. |
| 2007/0079794 A1 | 4/2007 | Rotter et al. |
| 2007/0240404 A1 | 10/2007 | Pekrul et al. |

FOREIGN PATENT DOCUMENTS

| | | | |
|---|---|---|---|
| CN | 1227810 A | | 9/1999 |
| EP | 197692 | | 10/1986 |
| EP | 0753657 | A1 | 1/1997 |
| EP | 568560 | B1 | 3/1997 |
| EP | 900115 | B1 | 7/2002 |
| EP | 1070841 | B1 | 4/2003 |
| EP | 1364696 | A1 | 11/2003 |
| EP | 969911 | B1 | 6/2004 |
| EP | 1767756 | | 3/2007 |
| GB | 568038 | | 3/1945 |
| GB | 909891 | A | 11/1962 |
| GB | 1150896 | A | 5/1969 |
| GB | 1304182 | A | 1/1973 |
| GB | 1582968 | A | 1/1981 |
| GB | 2064359 | A | 6/1981 |
| GB | 2172814 | | 10/1986 |
| GB | 2376650 | | 12/2002 |
| GB | 2393760 | | 4/2004 |
| JP | 1147154 | | 6/1976 |
| JP | 54067824 | | 5/1979 |
| JP | 54151725 | A | 11/1979 |
| JP | 56096147 | A | 8/1981 |
| JP | 56113039 | A | 9/1981 |
| JP | 56151255 | A | 11/1981 |
| JP | 56165757 | A | 12/1981 |
| JP | 58077156 | A | 5/1983 |
| JP | 59150961 | A | 8/1984 |
| JP | 60243361 | A | 12/1985 |
| JP | 62126264 | A | 6/1987 |
| JP | 63041655 | A | 2/1988 |
| JP | 1106971 | | 4/1989 |
| JP | 2045647 | | 2/1990 |
| JP | 2197483 | A2 | 8/1990 |
| JP | 2227546 | | 9/1990 |
| JP | 3222813 | A2 | 10/1991 |
| JP | 4347357 | | 12/1991 |
| JP | 6346733 | A2 | 12/1994 |
| JP | 7019038 | | 1/1995 |
| JP | 7127531 | | 5/1995 |
| JP | 8232654 | A2 | 9/1996 |
| JP | 8232786 | A | 9/1996 |
| JP | 9088738 | | 3/1997 |
| JP | 9168711 | | 6/1997 |
| JP | 2000303835 | A2 | 10/2000 |
| JP | 2001200768 | | 7/2001 |
| JP | 62197623 | A2 | 9/2001 |
| JP | 2002284072 | A2 | 10/2002 |
| JP | 2004225550 | A | 8/2004 |
| JP | 2006220002 | A | 8/2006 |
| JP | 2006281950 | A2 | 10/2006 |
| JP | 2007062643 | | 3/2007 |
| JP | 2007113404 | A2 | 5/2007 |
| JP | 2007133404 | A | 5/2007 |
| KR | 2001108884 | | 12/2001 |
| WO | 9741345 | A1 | 11/1997 |
| WO | 9836162 | A1 | 8/1998 |
| WO | 9849440 | A1 | 11/1998 |
| WO | 0074818 | A1 | 12/2000 |
| WO | 0170374 | A1 | 9/2001 |
| WO | 0231341 | A1 | 4/2002 |
| WO | 2005075805 | | 8/2005 |
| WO | 2006002798 | | 1/2006 |
| WO | 2006044893 | A2 | 4/2006 |
| WO | 2007047433 | A | 4/2007 |

OTHER PUBLICATIONS

Mahle—http://www.mahle.com/C1256F7900537A47/vwContentByKey/W26QPJLS933STULEN/$File/Filterprogramm_en.pdf.
Fleetguard OptiAir Technical Bulletin, Air Cleaner Data Sheet and Performance Curve; (c) Fleetguard 2005, TB08/04-2 Rev. 1, Printed in USA; www.fleetguard.com.
http://www.cumminsfiltration.com/pdfs/product_lit/americas_brochures/air_housings.pdf Fleetguard filter housings on pp. E111 & E112.
http://www.cummunsfiltration.com/pdfs/product_lit/americas_brochures/LT32624.pdf OptiAir filter system.
http://www.cumminsfiltration.com/pdfs/product_lit/americas_brochures/LT32599_s4.pdf Fleetguard filter housing on p. 95 and OptiAir filters on pp. 101-126.

http://www.mann-hummel.com/industrialfilters/upload/doc/HBSKOJhyaql.pdf includes a section on Europiclon filters.

Fleetguard air cleaners; Nelson—Fleetguard 1-3, Nelson Assembly 1 & 2; competitor air cleaner assemblies; admitted prior art; 5 pages—date unknown.

Mann +Hummel's High Performance Air Cleaner Gives the Mercury Marauder a Boost in Performance; Advanced Materials & Composites News, May 2002; n539; Monday, May 20, 2002; http://dialogpro.dialog.com.

Mahle—http://www.mahle.com/C1256F7900537A47/vwContentByKey/W26QPJLS933STULEN/$File/Filterprogramm_en.pdf.

Fleetguard OptiAir Technical Bulletin, Air Cleaner Data Sheet and Performance Curve; (c) Fleetguard 2005, TB08/04-2 Rev. 1, Printed in USA; www.fleetguard.com.

http://www.cumminsfiltration.com/pdfs/product_lit/americas_brochures/air_housings.pdf Fleetguard filter housings on pp. E111 & E112.

http://www.cumminsfiltration.com/pdfs/product_lit/americas_brochures/LT32624.pdf OptiAir filter system.

http://www.cumminsfiltration.com/pdfs/product_lit/americas_brochures/LT32599_s4.pdf Fleetguard filter housing on p. 95 and OptiAir filters on pp. 101-126.

http://www.mann-hummel.com/industrialfilters/upload/doc/HBSKOJhyaql.pdf includes a section on Europiclon filters.

PCT Written Opinion of the International Searching Authority, based on International Application No. PCT/US2009/003371, Nov. 23, 2009; 6 pages.

Fleetguard OptiAir—The Next Generation in Air Intake Design; http://www.cumminsfiltration.com/pdfs/product_lit/americas_brochures/LT32624.pdf; 2007; Rev. 2.

EP100046036 Search Opinion and Report; Jul. 12, 2010; 5 pages.

EP100046044 Search Opinion and Report; Jul. 14, 2010; 4 pages.

PCT/US2006/040081; International Search Report; May 2, 2007; 5 pages.

EPA No. 06825905.0-2311; EP Office Action dated Aug. 5, 2008 and Applicant Amendment dated May 14, 2009; 10 pages.

\* cited by examiner

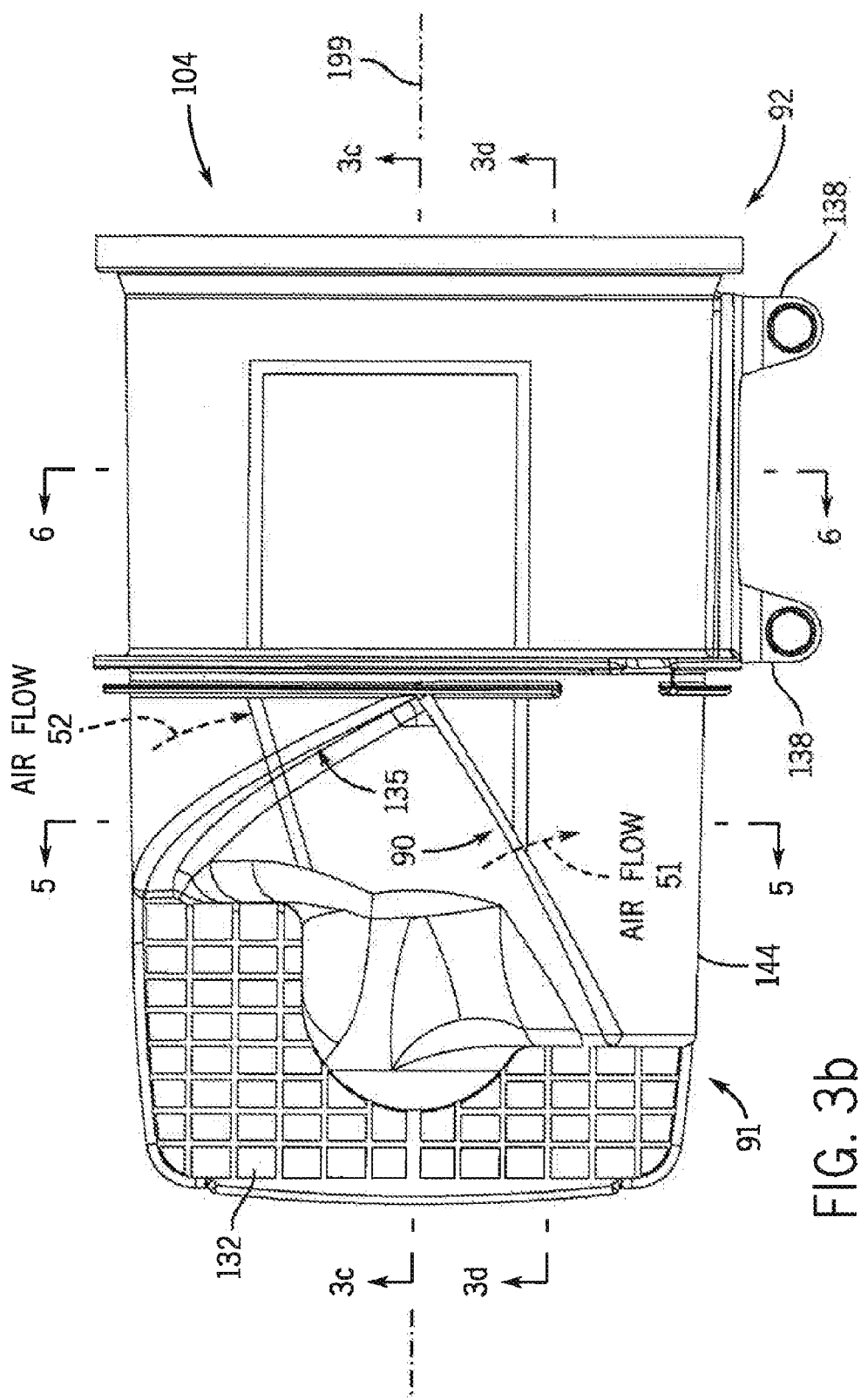

AIR CLEANER ASSEMBLY

CROSS-REFERENCE TO RELATED APPLICATIONS

This application claims the benefit of U.S. provisional patent application No. 60/726,309 entitled "Air Cleaner Assembly" filed on Oct. 12, 2005, which is hereby incorporated by reference herein.

STATEMENT REGARDING FEDERALLY SPONSORED RESEARCH OR DEVELOPMENT

--

FIELD OF THE INVENTION

The present invention relates to filtration systems and methods, for example, air filtration systems and methods such as those employed in conjunction with internal combustion engines.

BACKGROUND OF THE INVENTION

An air cleaner is a device installed on an internal combustion engine to provide clean air for combustion within the engine cylinder. Heavy duty air cleaners are typically used on engines that power devices used for industrial purposes, for example construction equipment or agricultural equipment.

FIG. 1 (Prior Art) provides a perspective, partially-exploded view of a typical conventional heavy duty air cleaner assembly 0. As shown in FIG. 1, the air cleaner assembly 0 includes an air cleaner 3 having a tubular shaped housing 4 and a filter element 8 that uses pleated paper to filter dust and other debris out of the combustion air flow. The filter element 8 is placed inside the tubular shaped housing 4, and is designed to provide a large filter paper surface area to increase the time the engine can be operated before cleaning or replacing the filter element. A removable end cap 5 can be affixed to and removed from the housing 4 to provide access to the filter element 8, allowing replacement or servicing of the filter element. The end cap 5 in the present view is shown to be attached to the housing 4 even though the filter element 8 is shown disassembled from (and outside of) the housing.

In addition to the housing 4, end cap 5, and filter element 8, FIG. 1 shows the air cleaner 3 to include a number of other components. In particular, the air cleaner 3 includes a mushroom-shaped rain cap 1 that is configured to be positioned onto (and over) an upwardly-extending input port 28 of the housing 4. Also, the air cleaner includes cover retaining clips 6 by which the end cap 5 is fastened to the housing 4, a dirt ejection valve 7, and a secondary or redundant filter element 9 (sometimes referred to as a "safety" filter element) that fits concentrically within an inner cylindrical space within the filter element 8 when the filter elements are installed within the housing. It should be noted that FIG. 1 shows the filter elements 8, 9 to be in positions that are approximately 180 degrees different from those the filter elements would occupy when implemented within the housing 4 and end cap 5 as shown, in order to show open ends of those filter elements that only exist at one of the two axial ends of each respective filter element.

The air cleaner assembly 0 further includes, in addition to the components of the air cleaner 3, an air duct 11, an adapter (air duct to carburetor) 13, gaskets 14 and 17, hose clamps 10, air cleaner brackets 18 and 24, and an air cleaner body clamp 20. Typically, the filtered air output at an output port 29 of the air cleaner 3 is ducted to a carburetor or throttle body on a spark ignited engine, or to an intake manifold on compression ignition engines. In the present embodiment, the air cleaner assembly 0 is shown to include the intake manifold 15. Also, the air cleaner assembly 0 includes various fastening components 2, 12, 16, 19, 21, 22, 23, and 25, which can include, for example, bolts, washers, screws, etc. The air cleaner 3 is mounted upon the engine by way of certain of these fastening components, along with the air cleaner brackets 18, 24 and the body clamp 20, which is coupled to the air cleaner brackets and surrounds the tubular housing 4. Also, the fastening component 2 is used to clamp the rain cap 1 to the input port 28.

To further extend the service life of the filter element 8, the tubular housing 4 of the air cleaner 3 is designed to spin the incoming air within the air cleaner, particularly within an annular space existing between the outer wall of the housing (and end cap 5) and the filter element 8 positioned within the housing. Dirt particles suspended in the incoming air centrifuge out against the outer walls of the tubular housing 4, eventually reaching the dirt ejection valve 7, which allows for the dirt to exit the air cleaner 3. Thus, the amount of dirt and dust that reaches the filter element 8 is significantly reduced. Further, the rain cap 1 is installed onto the input port 28 of the housing 4 to prevent ingestion of moisture and to prevent other large debris from entering the housing.

While relatively heavy dirt particles tend to exit the air cleaner 3 by way of the dirt ejection valve 7, the otherwise unfiltered air continues through the air cleaner 3 by passing radially inward through the tubular pleated paper of the filter element 8, and then proceeds further radially inward through the secondary filter element 9 as well, until the air reaches a central axial tubular passage within the secondary filter element. The filtered air then passes through and out of the axial tubular passage by way of the output port 29 of the tubular housing 4. The filtered air exiting the output port 29 of the tubular housing 4 then is ducted to the engine.

As mentioned, FIG. 1 shows the air cleaner 3 employed as a heavy duty air cleaner in connection with the intake manifold 15. When the air cleaner assembly 0 is assembled and installed in relation to an engine (not shown), the air duct 11 is coupled between the output port 29 of the air cleaner 3 and the adapter 13 by way of the hose clamps 10 (and related fastening components), where the adapter 13 in turn is coupled to the intake manifold 15 with one of the gaskets 14 positioned therebetween. The air duct 11, which can be a rubber hose, thus conducts the filtered air into the engine intake manifold 15 by way of the adapter 13. The hose clamps 10 are used to provide air tight seals between the air duct 11 and each of the output port 29 of the air cleaner housing 4 and the adapter 13 (or, in cases where the adapter is not used, to the intake manifold itself).

Although conventional air cleaners such as that of FIG. 1 successfully filter air, it would be desirable if certain aspects of such air cleaners could be improved. For example, with respect to the rain cap 1 as can be used on such air cleaners, the rain cap is not ideal insofar as it constitutes an additional, large component that protrudes off of the housing. Not only is the protruding rain cap vulnerable to being knocked off of the air cleaner assembly, but also it increases the overall size of the air cleaner assembly 0 in a manner that makes it more cumbersome to install and use. This can particularly limit the applicability of the air cleaner 3/air cleaner assembly 0 in some circumstances where a smaller device is required.

Further for example, while conventional air cleaners such as the air cleaner 3 are designed to achieve a swirling, helical motion of the unfiltered air as it enters into the air cleaner housing, such air cleaners typically only have a chamber that, due to the shape of interior wall, positively influences the air to take this path over the course of about 90 degrees. Because of the limited degree to which the air is influenced to take on the swirling motion, the swirling motion imparted to the unfiltered air is often not as strong as might be desirable in order to achieve maximal centrifugal force action upon dirt particles and other large debris such that such particles and debris are directed away from the filter element within the air cleaner.

Additionally, the manner in which the air cleaner 3 is coupled to the intake manifold 15 and/or other portions of the engine on which the air cleaner is mounted requires a large number of components (e.g., the air duct 11, the hose clamps 10, the adapter 13, the body clamp 20, numerous assorted fastening devices, etc.). Consequently, assembly of the air cleaner 3 onto an engine can be a relatively complicated operation. For example, it can be relatively difficult or time-consuming to assemble the air duct 11 in conjunction with the housing 4 and the adapter/intake manifold 13, 15 in a sealed, airtight manner. Further, because of the large number of parts, the costs associated with not only the assembly of the air cleaner 3 onto an engine but also the manufacturing of the components of the air cleaner assembly 0 are higher than what they might desirably be.

Therefore, it would be advantageous if an improved design for an air cleaner assembly could be achieved. In particular, in at least some embodiments, it would be advantageous if a cumbersome mushroom-shaped rain cap atop a protruding, upwardly-extending air cleaner input port was not necessary, and/or if the air cleaner assembly was a package of smaller size or more practical shape so as to allow the air cleaner assembly to be implemented in smaller spaces or in certain applications requiring such smaller packages or packages of a less cumbersome size or shape. Also, in at least some embodiments, it would be advantageous if the swirling action within the air cleaner could be enhanced. Further, in at least some embodiments, it would be advantageous if the number and complexity of parts used in assembling the air cleaner to an engine/intake manifold could be reduced.

BRIEF SUMMARY OF THE INVENTION

In at least some embodiments, the present invention relates to an air cleaner that includes a housing portion having an inlet, a filter element positioned within the housing portion, and a rain cover coupled to the housing portion so that the inlet opens into the rain cover. The rain cover includes an opening along an underside of the rain cover to allow air to enter into the air cleaner, and at least a preponderance of the rain cover extends substantially no higher than the housing portion.

In at least some further embodiments, the present invention relates to an air cleaner that includes a filter element, and a housing within which is positioned the filter element and further having an inlet and an outlet, the outlet being formed by way of an integrated extension. The integrated extension is configured to allow the housing to be directly coupled to at least one of a carburetor and an intake manifold without any intermediate air duct.

In at least some additional embodiments, the present invention relates to an air cleaner that includes a filter element configured to filter air, and a housing portion within which is positioned the filter element. The housing portion includes a shaped wall, where the shaped wall includes an exterior surface and an interior surface, and where the shaped wall influences a path of the air that is to be filtered both as the air passes alongside the exterior surface and as the air passes alongside the interior surface.

Also, in at least some embodiments, the present invention relates to a method of operating an air cleaner. The method includes receiving air at a downwardly-opening orifice formed within a rain cover, imparting a helical motion upon the air as it proceeds within a first chamber formed between the rain cover and a housing portion and providing the air into an inlet of the housing portion. The method additionally includes further imparting the helical motion upon the air as it proceeds within a second chamber of the housing portion, filtering the air, and outputting the filtered air.

BRIEF DESCRIPTION OF THE DRAWINGS

FIG. 3*b* shows a top view of a housing portion of the improved air cleaner of FIG. 2;

DETAILED DESCRIPTION OF THE PREFERRED EMBODIMENT

Figure 1:
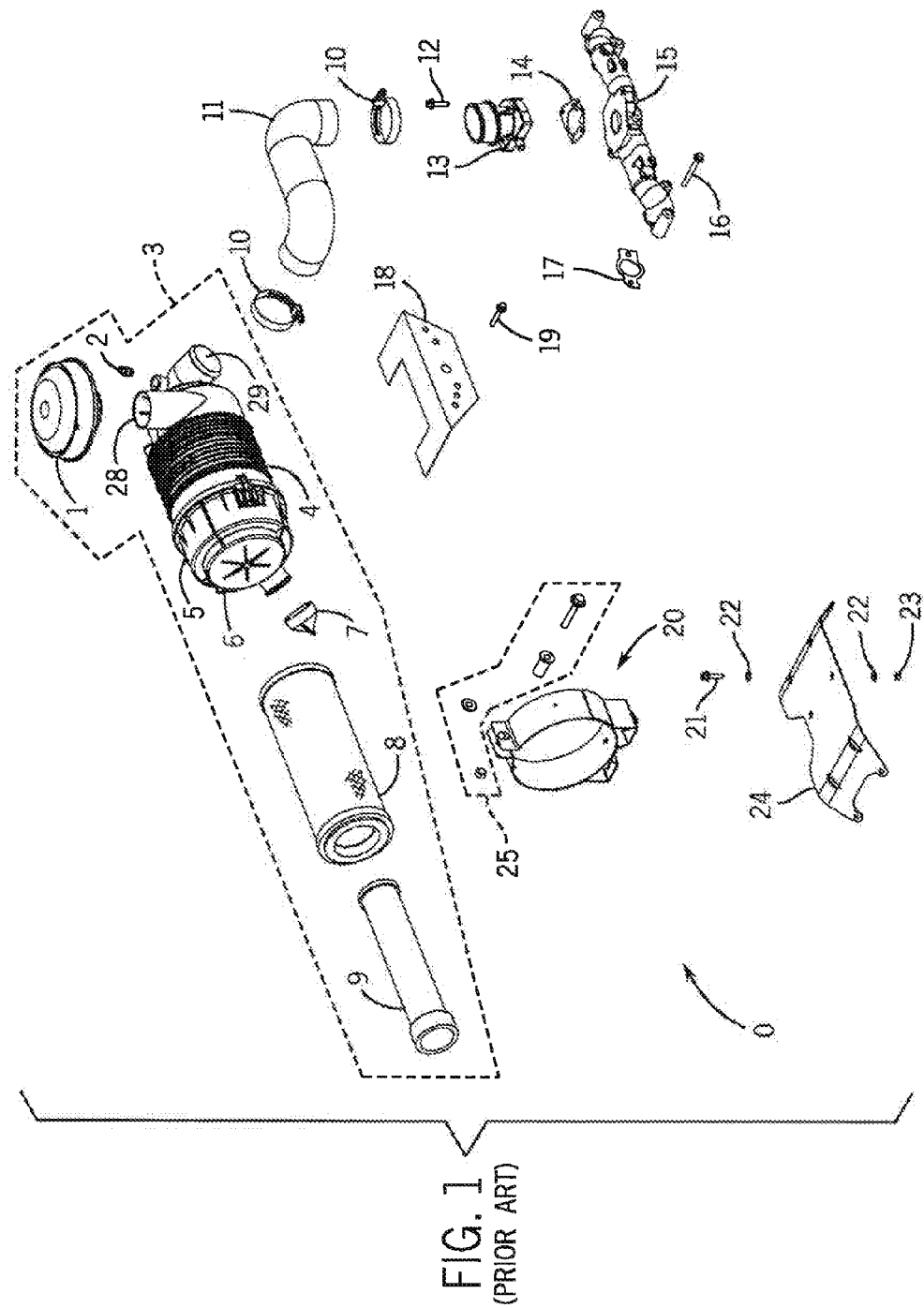
FIG. 1 is a perspective, exploded view of a Prior Art air cleaner assembly.
Figure 2:
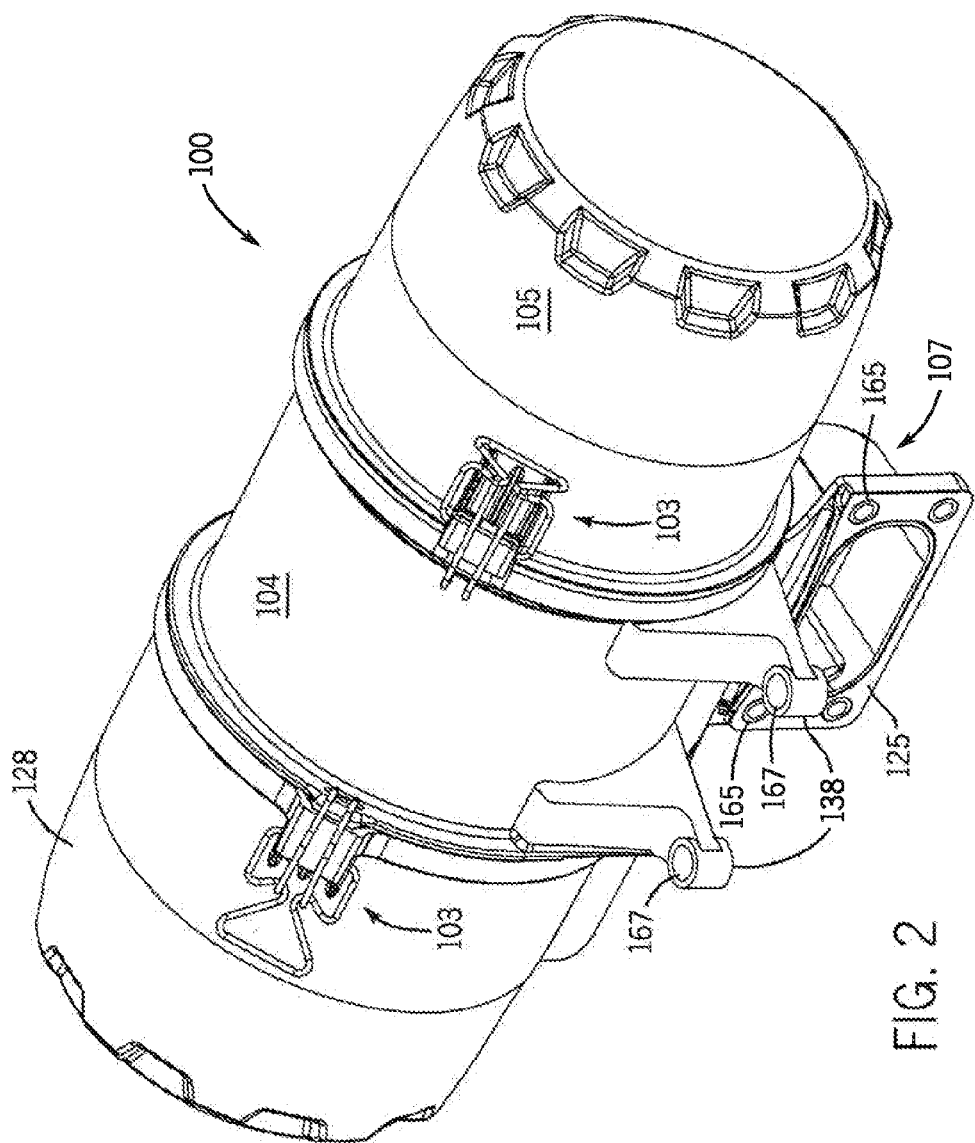
FIG. 2 is a perspective view of an improved air cleaner in accordance with at least one embodiment of the present invention.

Referring to FIG. 2, an improved air cleaner 100 in accordance with certain embodiments of the present invention is shown in perspective view. In addition to having a main tubular or cylindrical housing portion 104 and an end cap 105, the improved air cleaner 100 also employs certain additional structures discussed in more detail with respect to FIGS. 3*a*-*d*. One of these additional structures is an additional housing component 107 that assists in conveying filtered air output by the air cleaner 100 to a carburetor, intake manifold or similar engine component (see FIG. 7), in place of the air duct 1, output port 29 connected to the air duct, clamps 10 and adapter 13 of conventional embodiments such as that shown in FIG. 1. The housing portion 104 and additional housing component 107 alternatively can be referred to as a first (or upper) housing or base, and a second (or lower) housing or base, respectively.

Further as shown in FIG. 2, in place of the body clamp 20 (and related components) of FIG. 1, the air cleaner 100 includes integral mounting brackets 138 that allow for the air cleaner 100 to be directly mounted onto an engine (or other surface). Additionally as shown, the improved air cleaner 100 employs a rain hood or cover 128 as shown in more detail in FIGS. 4a and 7 rather than the rain cap and associated upwardly-directed input port of the air cleaner 3 of FIG. 1. When the air cleaner 100 is fully assembled, both the end cap 105 and the rain cover 128 are coupled to the housing portion 104 by way of retaining clips or attachment clasps 103, which typically are metal, plastic or rubber.

The present air cleaner 100 is intended to be used as a heavy duty air cleaner, for example, for use in conjunction with a 30 to 40 horsepower v-twin engine. However, the present invention is also intended to encompass a wide variety of other embodiments of air cleaners of different sizes, shapes and composition (not necessarily heavy duty) other than the air cleaner 100, including air cleaners that are applicable with respect to other types of engines as well as with respect to other devices that require air filtration. Indeed, it is also envisioned that embodiments of the present invention will be employed in circumstances requiring the filtration of substances other than air including, for example, other gases, water, or oil. Among these circumstances are ones in which annular/cylindrical filtering media are employed and where swirling of the substances is advantageous as a preliminary filtration step prior to passage of the substances through the filtering media.

Figure 3A:
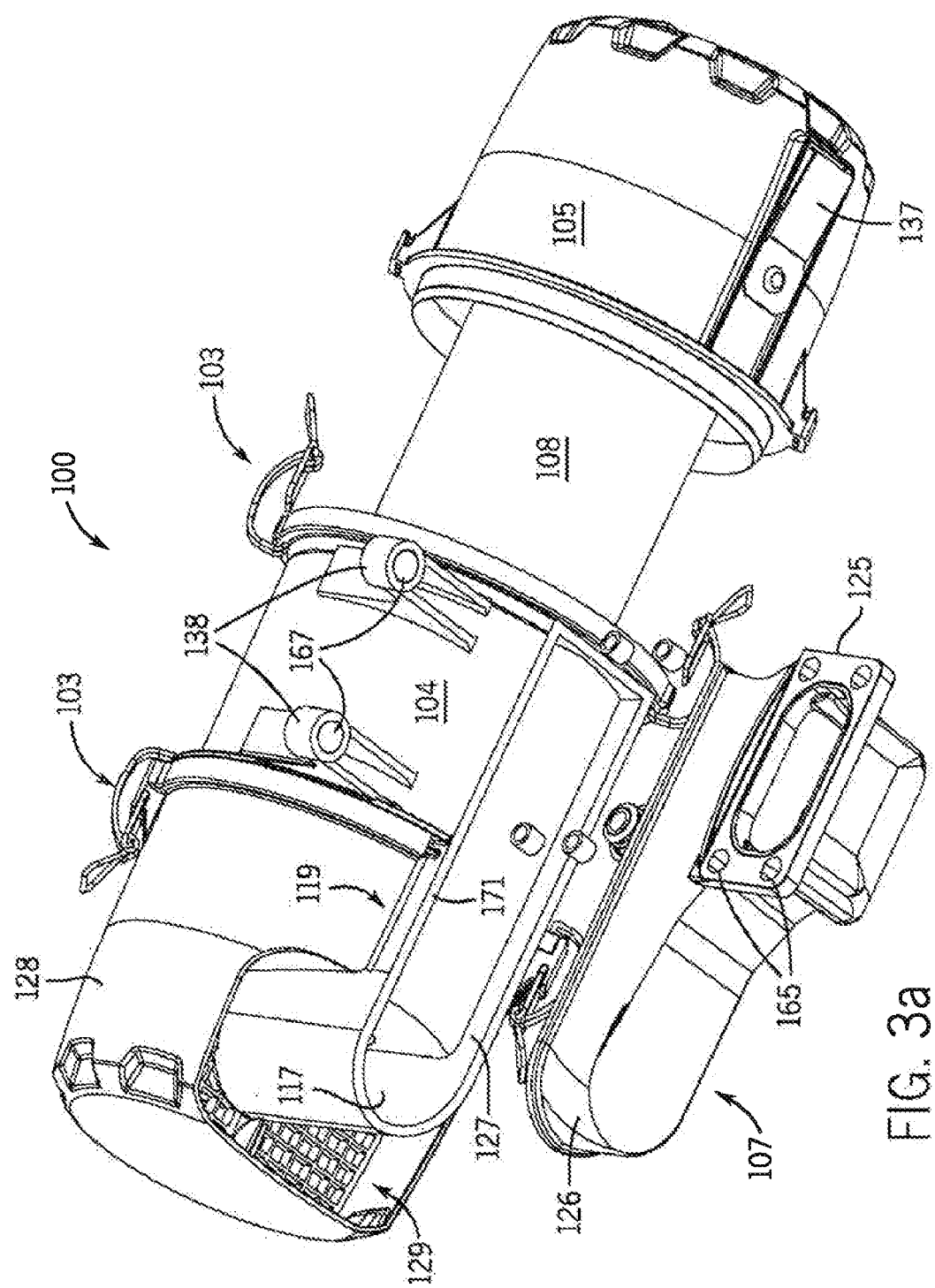
FIG. 3*a* is a perspective, partially-exploded view of the improved air cleaner of FIG. 2 in which an end cap and a half-duct air channel in particular are exploded from the air cleaner.

Turning to FIG. 3a, the improved air cleaner 100 is shown in a perspective, partially-exploded view, in particular, with the end cap 105 exploded from the cylindrical housing portion 104 so as to reveal a primary filter element 108 positioned within and extending out from the housing portion. Further, the additional housing component 107 is shown exploded from the cylindrical housing portion 104. The additional housing component 107 has an elbow (or curved integral adapter) 125 and a half-duct channel 126, formed as one piece. The half-duct channel 126 forms a trough (see also FIG. 5) that at one end has an outlet that is the elbow 125. The housing portion 104 is shown to include a complementary half-duct or mating channel 127 along a bottom surface 119 of the housing portion. An outlet channel 117 connects the interior of the air cleaner 100 with the mating channel 127.

When the air cleaner 100 is assembled, the additional housing component 107 and housing portion 104 are bonded and integrated together to form an airtight passage for clean air being emitted from the air cleaner. The bond in particular is formed between complementary edges 171 of the mating channel 127 and half-duct channel 126 (only the edge of the mating channel is shown in FIG. 3a), each of which in the present embodiment is an elongated rectangle that is rounded at one end. In at least some such embodiments, the bond is achieved by way of a welding process, such as hot plate welding, sonic welding, butt welding, etc. In at least some other embodiments, the bond is achieved by way of a glue or adhesive. In still other embodiments, the bond is achieved by way of bolts, screws or other fasteners, or by a combination of such fasteners with glue or welding. Additionally, in alternate embodiments, the housing portion 104 and additional housing component 107 are formed integrally with one another; that is, the additional housing component is formed as part of the housing portion 104.

FIG. 3b shows a top view of the housing portion 104, that is, with the rain cover 128 and end cap 105 both removed from the housing portion. As shown, the housing portion 104 includes an inlet 90 into which unfiltered air is drawn. Upon entering the inlet 90, the unfiltered air is directed within the housing portion 104 both axially and circumferentially (e.g., helically) away from a front end 91 toward a rear end 92 of the housing portion, where the circumferential motion involves movement along an exterior wall 144 of the housing portion, between the exterior wall and the filter element 108, so as to swirl around the filter element 108. Arrows 51 and 52 show exemplary directions of air flow as it enters the inlet 90 (arrow 51) and as the air continues to swirl around within the housing portion (arrow 52).

Also shown in FIG. 3b is a substantially flat grate or grid 132 extending from, and integrally formed with, the front end 91 of the housing portion 104. As discussed further with reference to FIGS. 4a-b, the grid 132 is surrounded by the rain cover 128 when the cover is positioned onto the housing portion 104. Thus, substantially all of the air circulating within the rain cover 128 passes through the grid 132 prior to entering the inlet 90 (except for possibly some minor excess flow between gaps formed between the perimeter of the grid and the interior surface of the rain cover). Consequently, as a result of the grid 132, particularly large debris never reaches the inlet 90 or enters the housing portion 104. Additionally, as mentioned above and discussed further with respect to FIGS. 5-6, as a result the swirling motion of the unfiltered air within the air cleaner 100, dirt and other large debris that enters the inlet 90 also tends to be removed from the swirling air due to centrifugal forces, before it enters and passes through the filter element 108.

Figure 3C:
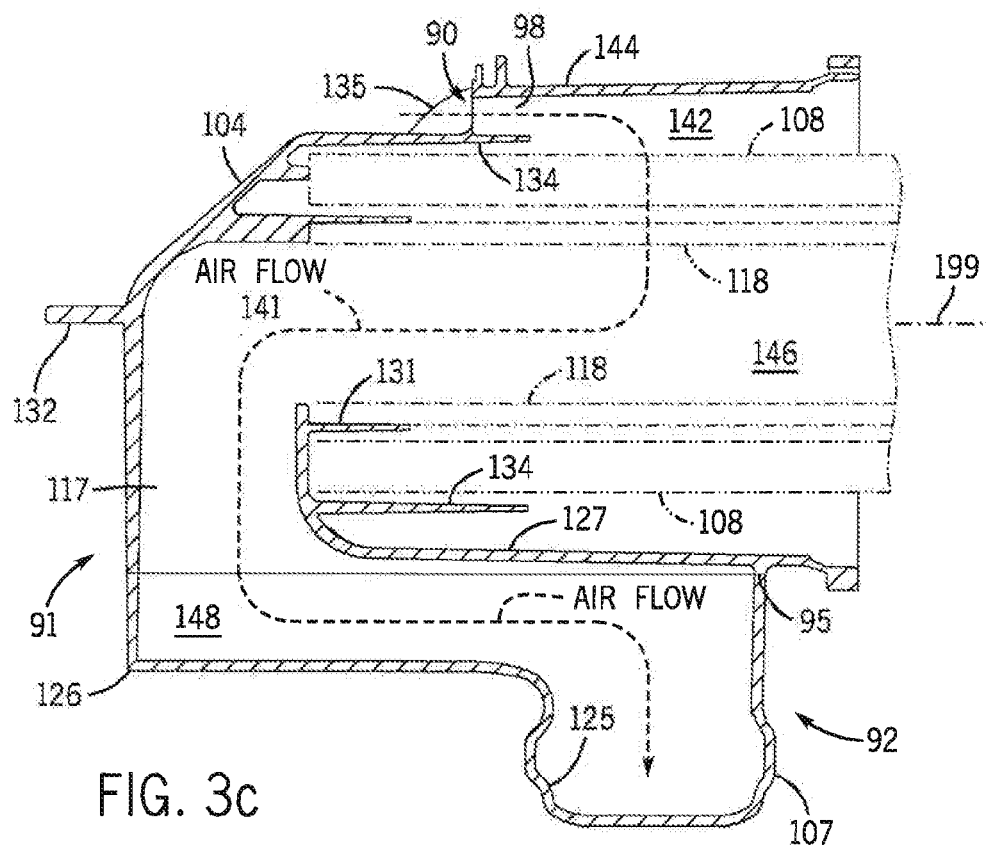
FIGS. 3*c* and 3*d* show cross-sectional views of the housing portion of FIG. 3*b* taken along lines C-C and D-D of FIG. 3*b*, respectively.
Figure 3D:
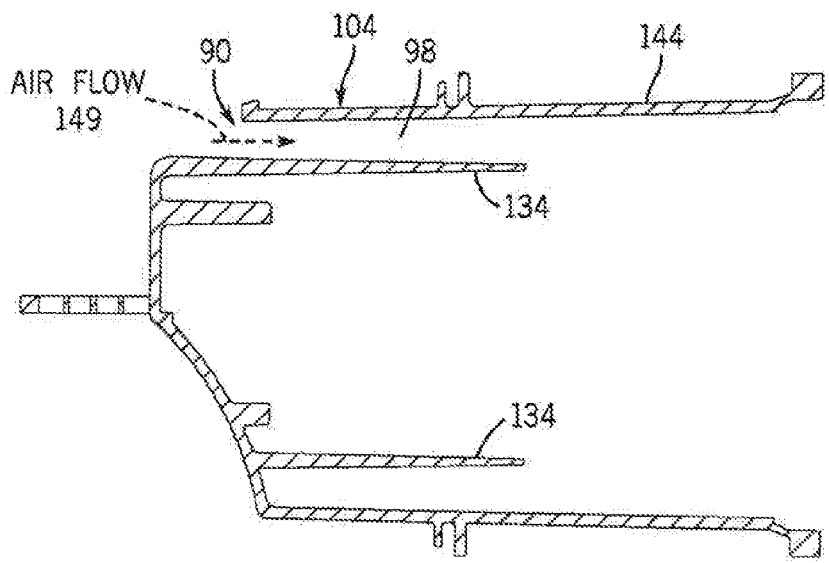

Further, FIGS. 3c and 3d respectively show cross-sectional views of the housing portion 104 taken along lines C-C and D-D of FIG. 3b, respectively. FIG. 3c in particular shows a cross-sectional view of the housing portion 104 taken vertically (or substantially vertically) along an axial center line 199 of the housing portion 104, where the axial center line in the present embodiment is horizontal (or substantially horizontal). Additionally, FIG. 3c shows in phantom and partial cutaway the filter element 108 as well as a secondary or redundant filter element 118 positioned concentrically within the primary filter element 108 as the filter elements would be positioned when the air cleaner 100 was fully assembled (as shown, the filter elements extend out from the housing portion 104 when positioned fully therein, and it is the end cap 105 that in combination with the housing portion fully encloses the filter elements within the air cleaner). Each of the filter elements 108, 118 are supported by and sealed with respect to an inwardly-extending tubular extension 131 of the housing portion 104 that leads to the outlet channel 117 of the housing portion. Also, each of the filter elements 108, 118 and the tubular extension 131 are axially centered about the axial center line 199.

As shown in FIG. 3c, air entering the housing portion at the inlet 90 generally follows a path indicated by a dashed line (and arrow heads) 141. More particularly, upon entering the inlet 90, the air first swirls within an annular space 98 formed between the exterior wall 144 of the housing portion 104 and a cylindrical intermediate inner wall 134 extending within the housing portion, generally following a helical path. The air then continues to swirl within an annular chamber 142 formed between the exterior wall 144 of the housing portion 104 and the primary filter element 108, generally continuing to follow a helical path so as to move from the front end 91 toward the rear end 92 of the housing portion 104. As a result, heavy dirt or dust particles move toward the rear end 92 at which is located a one-way valve 137 (see FIG. 3a), by which this material is ejected out of the air cleaner 100, and which in at least some embodiments can be a metal or plastic reed valve, or a rubberized valve.

While the heavy dirt or dust particles helically flow toward the rear end 92, the unfiltered air does not indefinitely continue to flow helically but rather eventually proceeds radially inward through the primary filter element 108 and subsequently through the secondary filter element 118, after which point the air (now filtered air) enters an interior, axially-extending cylindrical cavity 146 within the secondary filter element. In at least some embodiments, the primary filter element 108 is a pleated paper filter element, while the secondary filter element 118 is a cloth or fibrous filter element. Upon reaching the cylindrical cavity 146, the air then proceeds out of the cavity through the tubular extension 131 and subsequently through the outlet channel 117. The filtered air then further proceeds through a combination passage 148 formed by the half-duct channel 126 (e.g., the trough formed therein) of the additional housing component 107 and the mating channel 127 of the housing portion 104, and subsequently through and out the elbow 125, the output orifice of which is located to the side of the vertical cross-section shown in FIG. 3c. FIG. 3c further shows a junction (or "weld line") 95 between the additional housing component 107 and the housing portion 104, where those two pieces are bonded, fastened, or otherwise coupled or joined together.

In comparison with FIG. 3c, FIG. 3d, which is taken along a vertical cross-section to the side of the vertical cross-section of FIG. 3c, does not substantially show the tubular extension 131, the outlet channel 117, the combination passage 148, the half-duct channel 126, the mating channel 127, the additional housing component 107, or the elbow 125, since these elements are generally located proximate to the vertical cross-sectional plane of FIG. 3c. FIG. 3d also illustrates by way of an arrow 149 that the inlet 90 by which air flows into the housing portion 104 extends over a fairly large circumferential distance.

Compared to the conventional system shown in FIG. 1, due to the use of the additional housing component 107 and housing portion 104 rather than the air duct 11, adapter 13, clamps 10, etc. of FIG. 1, the improved air cleaner 100 employs fewer parts and eliminates hose joints where air leakage can occur. As a result, the improved air cleaner 100 is less likely to have dirt or dust leaks into the clean combustion air in comparison with conventional designs such as that of FIG. 1.

Figure 4A:
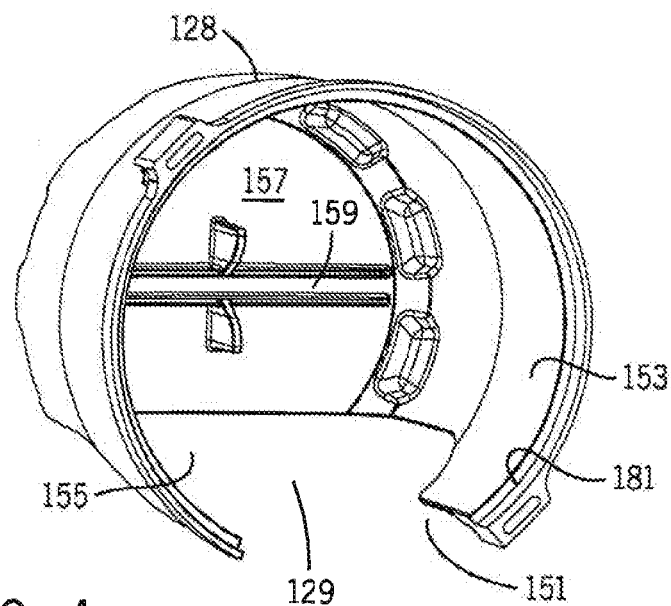
FIG. 4*a* is a perspective view of a rain cover of the improved air cleaner of FIG. 2.
Figure 4B:
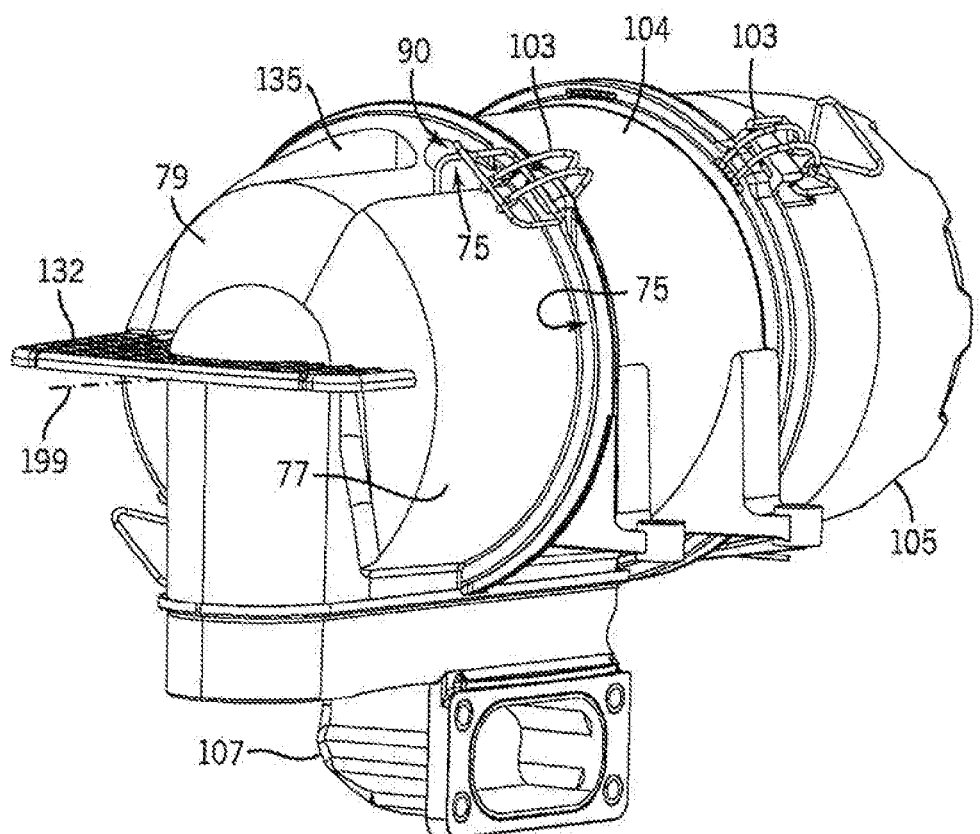
FIG. 4*b* is a perspective view of the housing portion of FIG. 3*b*, combined with an end cap, of the improved air cleaner of FIG. 2.

Turning to FIGS. 4a-b, the improved air cleaner 100 replaces the rain cap 1 and associated upwardly-extending inlet of the housing 4 of FIG. 1 with the low profile rain cover or hood 128 and the inlet 90 of the housing portion 104. FIG. 4a in particular shows the rain cover 128 when removed from the housing portion 104. As shown, the rain cover 128 is effectively an empty cup-shaped structure that has substantially the same cylindrical diameter as both the housing portion 104 and the end cap 105, and is similar in its exterior shape to the end cap, but differs from the end cap particularly in that it includes an air inlet opening 129 at or proximate its bottom. In the present embodiment, the opening 129 is effectively an aperture created by the absence of a portion of the cylindrical wall of the rain cover 128, and extends the entire axial length of the rain cover. Also in the present embodiment, the opening 129 has a first region 151 that is relatively narrow in circumferential extent at an open end 153 of the rain cover 128 that faces the housing portion 104 when assembled thereto, and also has a second region 155 that is wider in circumferential extent farther away from the open end 153.

In addition to the retaining clips/clasps 103 that couple the rain cover 128 to the housing portion 104, a number of ribs 75 are formed along the exterior surface of the housing portion 104. When the rain cover 128 is assembled to the housing portion 104, an outer edge or lip 181 of the rain cover overhangs or surrounds one or more of the ribs 75, such that a seal is formed between the rain cover and the housing portion. Among other things, this seal serves to direct moisture away from the air inlet opening 129. In at least some embodiments, the ribs 75 extend both circumferentially around the housing portion 104 and axially along the surface of the housing portion such that the seal formed by the ribs at the interface of the rain cover and the housing portion is a labyrinth-type seal. In other embodiments, the ribs 75 only extend circumferentially or axially, but not both, or extend in some other arrangement. Although in the present embodiment the ribs 75 are formed on the housing portion 104, in alternate embodiments the ribs could be formed on the rain cover and/or on both the cover and the housing portion.

As mentioned above, the grid 132 is molded integrally with the housing 104, and serves to prevent large dirt particles, debris, birds, rodents, etc. from entering the air cleaner 100. In the present embodiment as shown in FIG. 4b, the grid 132 is a planar wall that extends horizontally (e.g., relative to the vertical cross-section shown in FIG. 3c) along the axial center line 199. The grid 132 extends substantially the entire inner diameter of the rain cover 128 and also extends axially outward sufficiently far so as to reach an inner end surface 157 of the rain cover (see FIG. 4a) when the rain cover is fully assembled to the housing portion 104. In the present embodiment, the inner end surface 157 of the rain cover 128 is further molded to include a slot 159 that is configured to receive the far end of the grid 132 when the rain cover 128 is fully coupled to the housing portion 104. In at least some alternate embodiments, a damping element (e.g., a round piece of closed cell foam material or rubber/elastomeric material) can also be provided within the rain cover 128, for example, within the slot 159, in order to damp vibrations.

When the rain cover 128 is fully assembled to the housing portion 104, the rain cover 128 interfaces both the grid 132 and the ribs 75 in such a manner that substantially the only (or at least the primary) flow passage from outside of the air cleaner 100 to the inlet 90 of the housing portion is by way of the grid 132. Further, because the air inlet opening 129 is downwardly facing, air and other items entering the air cleaner 100 must enter from underneath the air cleaner (or at least underneath the rain cover 128). Consequently, due to the assembly of the rain cover 128 to the housing portion 104, including the grid 132, rainwater (and other materials) are less likely to enter (or are entirely prevented from entering) the air cleaner 100, or at least the housing portion. Further, because the rain cover 128 has the same or substantially similar dimensions as the housing portion, particularly in terms of diameter and thus height (and in particular protrudes substantially no higher than the top of the remainder of the air cleaner), the rain cover is much less obtrusive, and consequently the air cleaner 100 is easier to install and maintain, and is less susceptible to damage, than conventional air cleaners.

Figure 5:
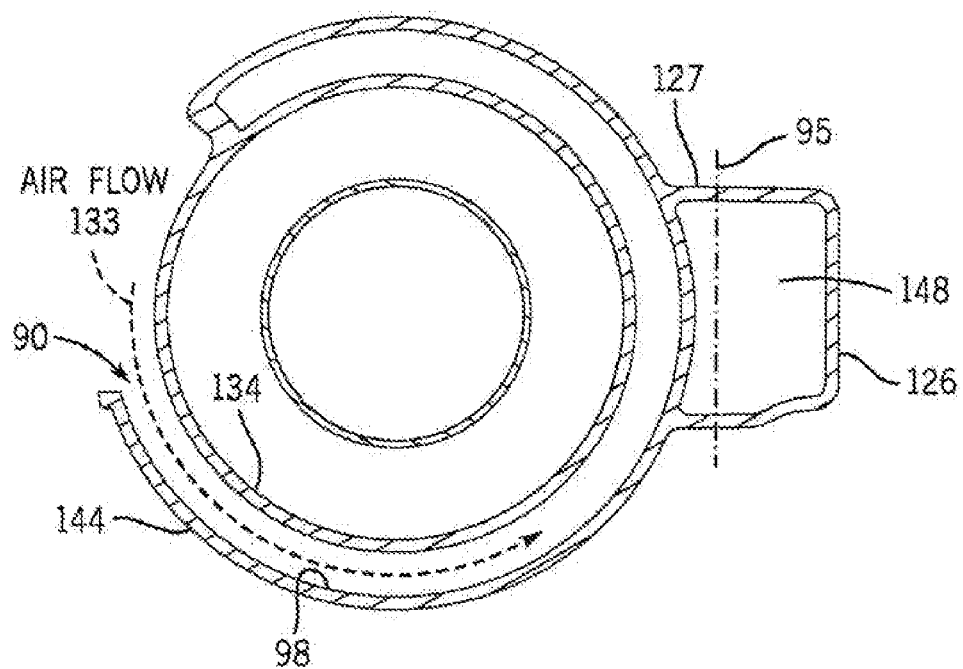
FIGS. 5 and 6 show cross-sectional views of the housing portion of FIG. 3*b* taken along lines 5-5 and 6-6 of FIG. 3*b*, respectively.
Figure 6:
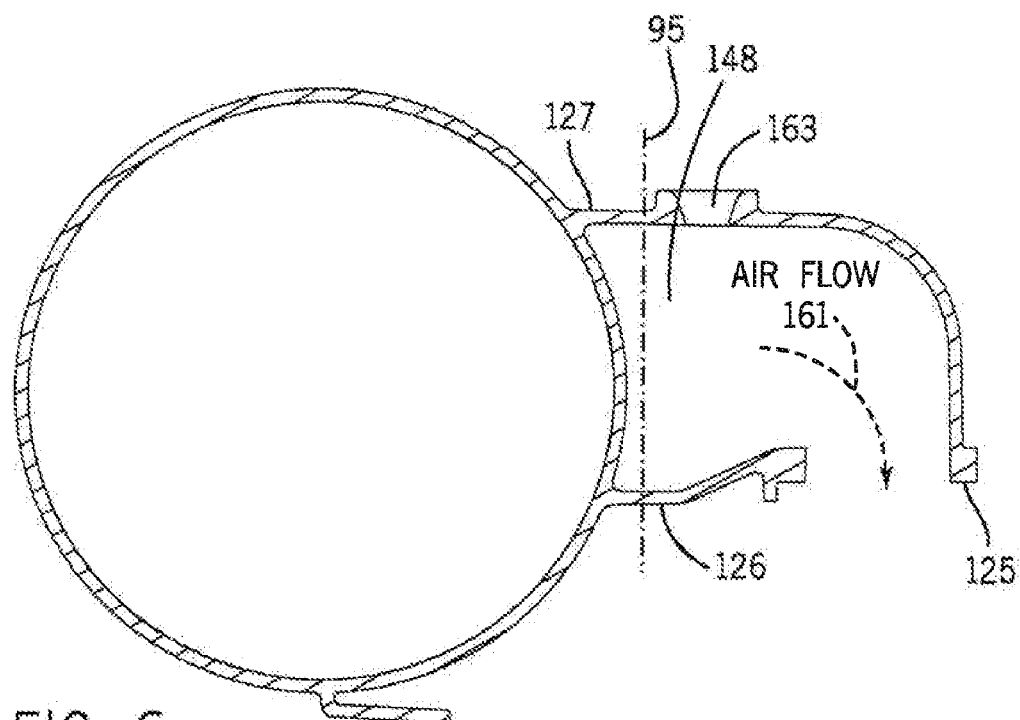

As discussed above, heavy duty air cleaners such as the present improved air cleaner 100 employ centrifugal forces to fling the heavy dirt particles and other small debris out of the induction air to pre-clean the air prior to entry into the filter elements 108, 118. FIGS. 5 and 6 show additional cross-sections of the housing portion 104 shown in FIG. 3b, particularly in order to provide additional views of the helical path of incoming air into and within the housing portion 104, as well as to further illustrate the flow of filtered air through the elbow 125, half-duct channel 126 and mating channel 127 discussed above. More particularly, as shown in FIG. 5, incoming air follows a curved path indicated by an arrow 133. Prior to entering the inlet 90 of the housing portion 104, the air follows the curved path in part due to its interaction with the inner surface of the rain cover 128 (not shown). Upon entering the inlet 90, the air continues to follow the curved path around the space 98 between the outer wall 144 of the housing portion 104 and an intermediate inner wall 134 within the housing portion.

As should be evident from FIGS. 3*c-d*, which also show the intermediate inner wall 134, the intermediate inner wall does not extend the entire length of the housing portion 104 between the front and rear ends 91, 92, but rather only extends a portion of that length. Thus, as discussed above, after the air proceeds nearly all of the way around the housing portion 104 (e.g., nearly 360 degrees), it proceeds into the annular chamber 142 formed between the exterior wall 144 of the housing portion 104 and the primary filter element 108, and then subsequently into the filter element 108. It should be noted that, although FIG. 5 shows the inlet 90 to be along the left side, in fact that left side corresponds to the top of the air cleaner 100/housing portion 104.

As noted above, the shape of the housing portion 104 also imparts an axial component to the air flow along the length of the housing. In particular, a shaped wall 135 shown particularly in FIG. 3*b* (and also in FIGS. 3*c*, 4*b* and 7) imparts an axial component to the flow. The shaped wall 135, which extends in a ramped, helical or screw-type manner for about 90 degrees around the circumference of the housing portion 104, serves to direct the unfiltered air in a helical manner both due to the passage of the air within the rain cover 128 along the exterior surface of the shaped wall prior to its entry into the inlet 90 (e.g., due to the fact that the inlet 90 is generally located farther from the front end 91 than the opening 129 of the rain cover), and also due to the passage of the air within the housing portion 104 after passing through the inlet 90, particularly as it again circles around within the space 98 so as to pass by the interior surface of the shaped wall. Due to the shaped wall 135, air is caused to swirl or spiral toward the rear end 92 of the housing portion 104. Dirt and dust can then collect at the end of the housing opposite the air inlet 90, and be emitted via the one-way valve 137.

Because of the combination of the rain cover 128 and the housing portion 104, and because the incoming unfiltered air is directed along both the inside surface of the shaped wall 135 as well as the exterior surface of the shaped wall, incoming air is directed in a helical, swirling motion over a greater distance within the improved air cleaner 100 than in conventional air cleaners. For example, in the conventional air cleaner 3 shown in FIG. 1, incoming air is directed by way of the rain cap 1 and input port 28 down a circular duct in the housing, and subsequently a vane or wall with a somewhat helical shape imparts spin to the air over merely about a quarter turn (e.g., about 90 degrees) inside the housing. In contrast, the improved air cleaner 100 is configured to positively exert force over 180 degrees upon the incoming unfiltered air so as to produce helical (including axial) air flow, where the 180 degrees of influence is distributed over about 450 degrees of overall air travel.

More particularly, since the shaped wall 135 extends approximately 90 degrees and since both the interior and exterior helical surfaces provided by the shaped wall produce helical (including axial) movement of the unfiltered air, the shaped wall positively causes helical air flow over about 180 degrees. That is, the shaped wall 135 imparts helical air flow both during the approximately quarter turn while the air is between the rain cover 128 and the housing portion 104 flowing along the shaped wall, and also during the approximately quarter turn while the air is within the housing portion alongside the shaped wall. At the same time, the unfiltered air does not experience the interior and exterior surfaces of the shaped wall 135 continuously, but rather must travel about 270 degrees between the ending of the exterior surface and the beginning of the interior surface, such that the effect of the helical surfaces is spread out over the course of about one full turn within the housing portion 104 and an additional quarter turn within the rain cover 128 prior to entry into the inlet 90.

In short, in the improved air cleaner 100, the surfaces of the shaped wall 135 positively influence helical (including axial) flow over about 180 degrees, and this 180 degrees of influence is spread out over 450 degrees of flow path. In effect, the positive influence of the exterior surface of the shaped wall 135 is subsequently boosted by the additional positive influence of the interior surface of the shaped wall. As a result, in comparison with conventional air cleaners such as that of FIG. 1, the improved air cleaner 100 results in the creation of greater helical air motion, resulting in improved diversion of dirt and dust to the one-way valve 137 and also resulting in less flow loss at the inlet 90.

In some alternate embodiments, additional helical, ramped or other shaped surfaces like the shaped wall 135 can be provided at other locations as well to further enhance the helical motion of the air within the air cleaner 100. For example, with respect to FIG. 4*b*, while the shaped wall 135 in the present embodiment is provided at a location 79 on the housing portion 104, an additional similar ramped wall could be provided at a diametrically opposite location 77 along the housing portion 104. If the housing portion 104 is modified to include such an additional shaped wall at the location 77, then the multiple shaped walls of the air cleaner will positively influence air flow to produce further helical movement of the unfiltered air over a greater distance than 180 degrees, for example, over 210 degrees, 270 degrees, or possibly even more (such a configuration is also provided in the alternate embodiment shown in FIG. 8 discussed below).

Referring still to FIGS. 5 and 6, additional cross-sectional views of the half-duct channel 126, mating channel 127 and elbow 125 are also provided. More particularly, FIG. 5 shows the half-duct channel 126 to have the trough-shape described above, and to be coupled to the mating channel 127 along the junction 95 so as to form the combination passage 148. FIG. 6 in turn shows where the combination passage 148 empties into the interior orifice of the elbow 125 allowing for airflow out of the air cleaner 100 into another component such as a carburetor or intake manifold, as indicated by an arrow 161. An optional orifice 163 is also shown in FIG. 6 to be formed within the half-duct channel 126. The orifice 163 allows a pressure detection device such as a differential pressure device or "filter minder" (not shown) to be coupled to the air cleaner 100, allowing for detection of when the air cleaner (and particularly the filter elements 108, 118) are clogged or plugged (e.g., with dirt) and need to be replaced. Otherwise, the orifice 163 typically is plugged with a plug when the air cleaner 100 is in use. It should further be noted that although FIGS. 5 and 6 show the half-duct channel 126, mating channel 127 and elbow 125 to be along the right sides of the respective figures, in fact those right sides correspond to the bottom of the air cleaner 100/housing portion 104.

Figure 7:
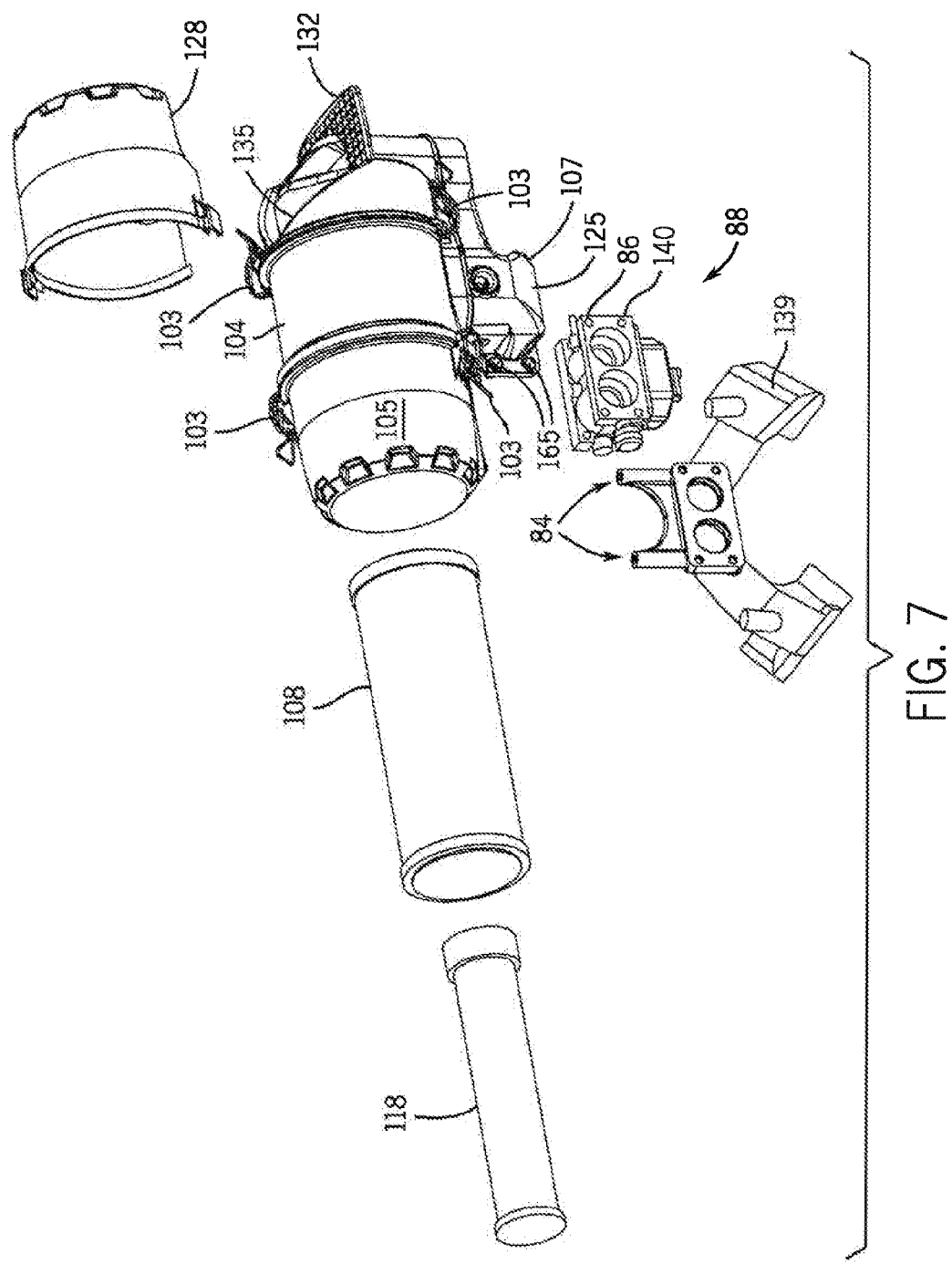
FIG. 7 shows a perspective, exploded view of the improved air cleaner of FIG. 2 along with additional engine components.

Turning to FIG. 7, a more detailed, partially-exploded view is provided of the entire air cleaner 100 implemented in conjunction with a portion of an engine, namely, an exemplary carburetor assembly 88, which in this example includes both an intake manifold 139 and a carburetor 140. In this view, the end cap 105 and additional housing component 107 in particular are still shown to be coupled to the housing portion 104 even though other components such as the rain cover 128 and the primary and secondary filter elements 108, 118 are shown to be removed from the housing portion. Nevertheless, it should be understood that both the end cap 105 and the rain cover 128 in the present embodiment are fastened to the housing portion 104 by way of the retaining clips/attachment clasps 103, albeit in other embodiments other fastening mechanisms could be employed such as, for example, bayonet-type fastening mechanisms, twist and lock mechanisms, screws, bolts, snaps, etc. Also, while in FIGS. 3a, 4a and 7, the attachment clasps 103 are shown to be primarily supported by the housing portion 104 rather than the end cap 105 and rain cover 128, such that the clasps are only in contact with the end cap and rain cover when those components are assembled to the housing portion, in alternate embodiments, the clasps could instead be primarily supported by the end cap and/or rain cover.

In the present embodiment, the air cleaner 100 also integrates the mounting system into the housing design, as shown by way of FIG. 7 as well as FIGS. 2 and 3a. More particularly, features on the elbow 125 such as bolt holes 165 match carburetor mounting fastener holes 86 on the carburetor 140, such that bolts (not shown) can be used to fasten the elbow directly to the carburetor. In the present example, the carburetor 140 is a double-barreled carburetor, and so the orifice of the elbow 125 is oval-shaped (see FIGS. 2 and 3a). However, in alternate embodiments employing a single-barreled carburetor the shape of the orifice of the elbow could be modified (e.g., become circular). Additionally, holes and/or bosses 167 on the mounting brackets 138 (again see FIGS. 2 and 3a) are configured to mate to features 84 designed into the intake manifold 139 so that the air cleaner 100 can be directly mounted upon the intake manifold.

In at least some other embodiments of the present invention, it is intended that the present invention encompass methods of assembling an air cleaner to a carburetor, intake manifold, other engine component, or other device by way of the above-described structures. Further, it is intended that the present invention in at least some embodiments encompass methods of limiting the intake of water, animals, insects, and/or other debris into an air cleaner, and/or methods of imparting greater amounts of helical motion upon unfiltered air entering the air cleaner, by way of the above-described structures (including directing air along both exterior and interior surfaces of a shaped wall). Also, it is intended that the present invention in at least some embodiments encompass methods of operating an air cleaner that include the providing of a downwardly-opening rain cover in relation to the air cleaner and directing that air through the rain cover into the housing of the air cleaner.

Although FIGS. 2-7 and the related discussion above describe one particular embodiment of an improved air cleaner and several variations thereof, the present invention is intended to encompass additional embodiments of improved air cleaners as well. For example, referring to FIGS. 8-10, a further embodiment of an improved air cleaner is similar to the improved air cleaner 100 except insofar as it employs a slightly different housing portion 200 and complementary additional housing component 210. As shown particularly in FIG. 8, which provides a perspective view of the housing portion 200, the housing portion is identical to the housing portion 104 except in a few respects. First, the housing portion 200 has a differently-configured mating channel 202 having an edge 204 that is generally foot-shaped, where the wider section of the foot-shaped mating channel is at the end of the channel opposite the end that receives air from the outlet channel 117 of the housing portion. Second, the housing portion 200 has multiple curved (in this example, L-shaped) fins 206 extending from within the mating channel 202 outward away from the housing portion. Third, the housing portion 200 has an additional shaped wall 205 located in the region of the housing portion corresponding to the region 77 described above with respect to FIG. 4b and thus, in this embodiment, the housing portion is capable of imparting even greater force upon incoming air tending to cause helical air flow within the housing portion than is provided by the air cleaner 100 described above.

Figure 9:
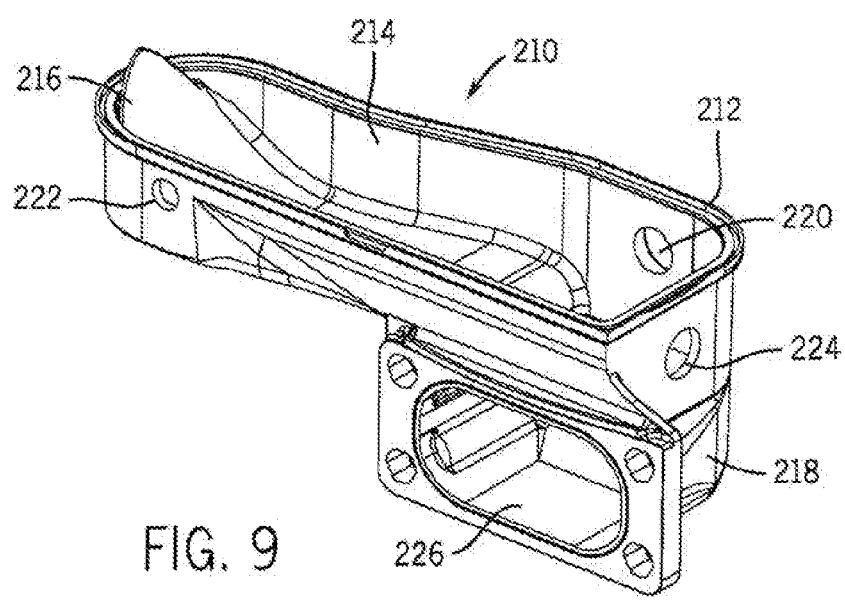
FIG. 9 shows a perspective, top view of an alternate embodiment of an additional housing component that can be employed in conjunction with the housing portion of FIG. 8.

As for the complementary additional housing component 210, as shown in FIG. 9, that component is similar to the additional housing component 107 in that it includes a half-duct channel 214 forming a trough and an elbow 218 leading outward from the trough to an outlet orifice 226. However, in contrast to the housing component 107, an edge 212 configured to mate with the edge 204 of the mating channel 202 is also generally foot-shaped like the mating channel (as is the half-duct channel 214 itself). Also, the half-duct channel 214 of the additional housing component 210 is formed to include a tongue-like extension 216 that rounds the inner bottom surface of the housing component at the end of the housing component opposite the end at which is located the elbow 218. In the present embodiment, the tongue-like extension 216 extends somewhat above and past the edge 212 of the half-duct channel 214. Further, in addition to including a first orifice 220 corresponding to the orifice 163 of FIG. 6, which can be coupled to a filter minder, the additional housing component 210 also includes a second orifice 222 proximate the tongue-like extension 216 by which a carburetor vent line can optionally be coupled to the half-duct channel 214, as well as a third orifice 224 proximate the first orifice by which a breather hose can be optionally coupled to the half-duct channel (again, each of the orifices 220-224 is optional and can alternatively be plugged rather than coupled to any of the above-mentioned structures).

Figure 8:
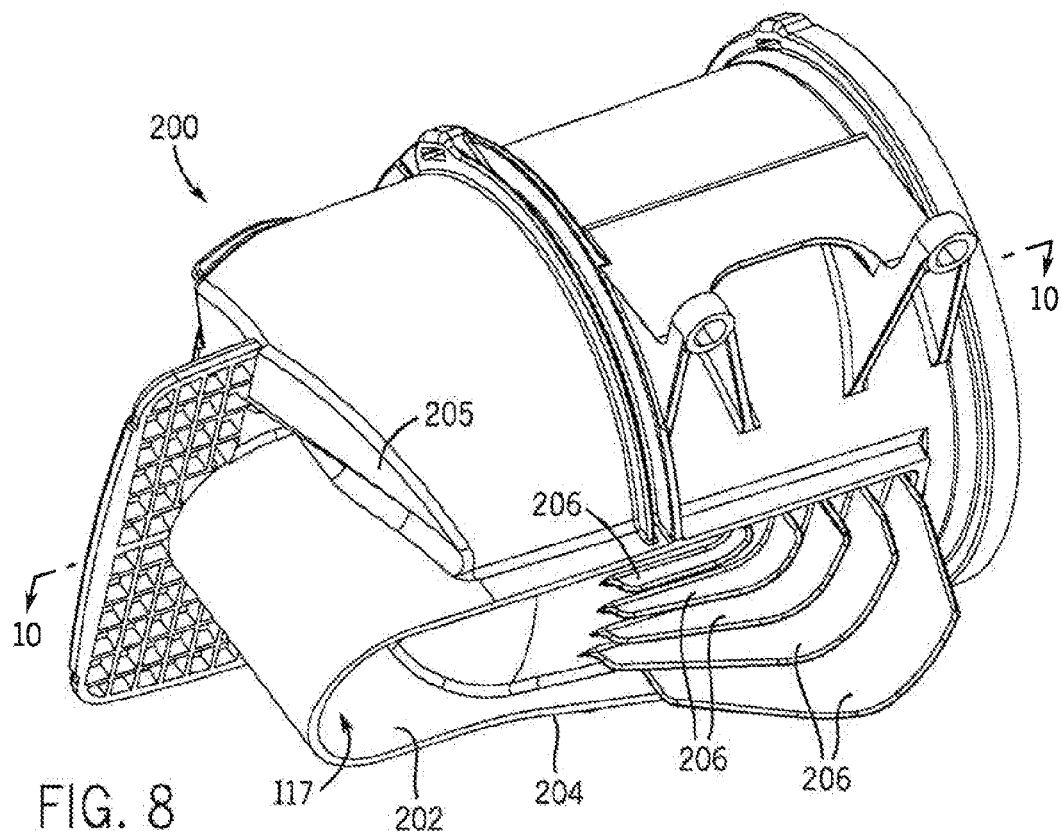
FIG. 8 shows a perspective, bottom view of an alternate embodiment of a housing portion similar to that of FIGS. 3*a*-3*d* except insofar as additional fins are formed within and extend from a channel along the bottom of the housing portion.
Figure 10:
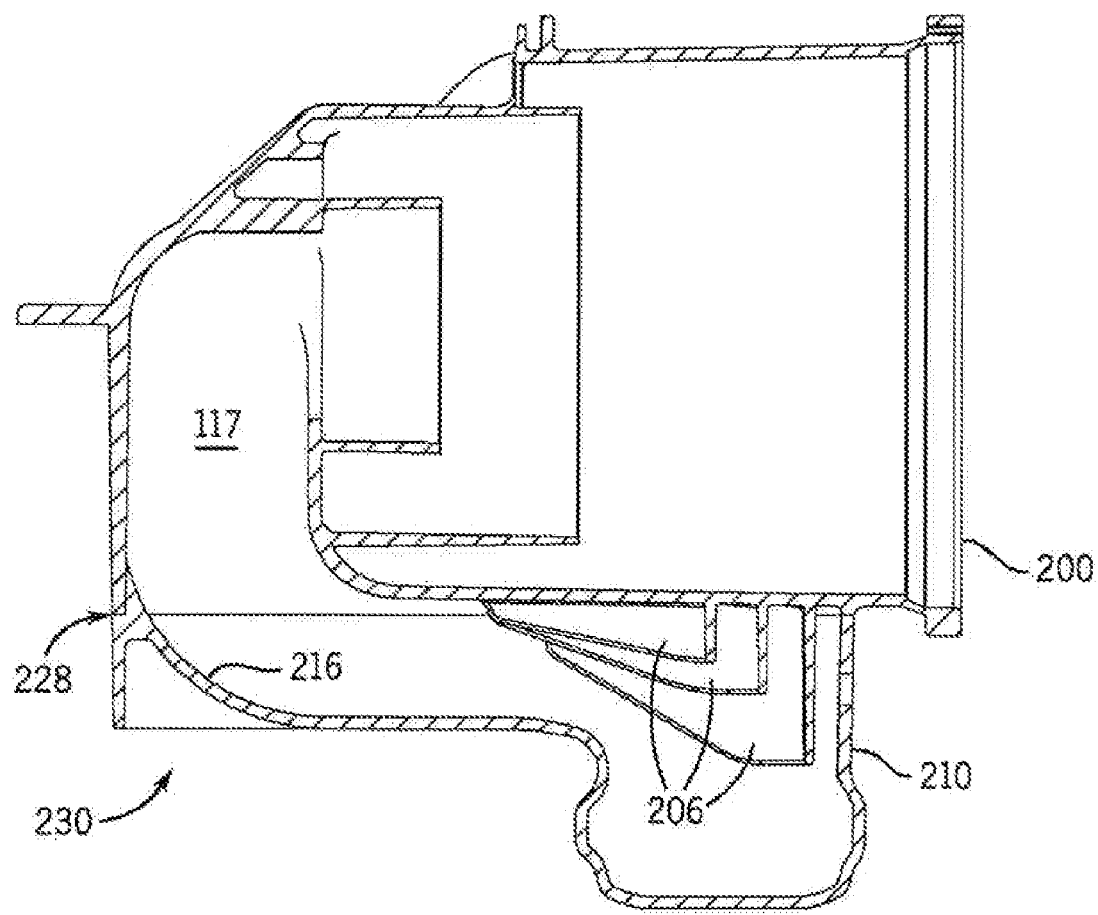
FIG. 10 shows a cross-sectional view of the housing portion of FIG. 8 when assembled to the additional housing component of FIG. 9, taken along a line 10-10 of FIG. 8.

FIG. 10 additionally provides a cross-sectional view showing an assembly 230 of the additional housing component 210 and the housing portion 200 when assembled along a weld line 228, taken along a line 10-10 of FIG. 8 (as the cross-section would appear if the two components were shown to be assembled in FIG. 8). As shown, when assembled, the tongue-like extension 216 protrudes somewhat into the outlet channel 117 of the housing portion 200, while the fins 206 protrude into the trough formed by the half-duct channel 214 (and even possibly slightly into the elbow 218). It should be understood that, while the present embodiment includes both the fins 206 and the tongue-like extension 216, in alternate embodiments only one or the other of these features can be present. Further, it should also be recognized that a similar additional housing component having a tongue-like extension could be used in combination with the housing portion 103 of FIGS. 2-7.

In the embodiment of FIGS. 8-10 or similar embodiments employing fins such as the fins 206, the fins can serve to enhance or otherwise modify the quality (and/or quantity) of airflow out of the elbow (not shown) into a carburetor/intake manifold. For example, the fins 206 can limit turbulence of the air flow, compensate for excessive air flow proximate one or another of the walls of the combination passage/elbow, or affect jets of the carburetor. Also, in embodiments employing the tongue-like extension 216, the tongue-like extension can further serve to enhance air flow from the outlet channel of the housing portion into the passage formed by the half-duct channel and mating channel, for example, by reducing stalling of air flow.

Although the fins 206 and tongue-like extension 216 are shown in FIGS. 8-10, one or more protrusions having shapes other than those of the fins or tongue-like extension can also be employed depending upon the embodiment. Also, in some embodiments, fins or other protrusions could be formed within the additional housing component rather than within the mating channel of the housing portion, or within both the additional housing component and the housing portion. Likewise, in some embodiments, a tongue-like extension could be formed as part of the housing portion rather than as part of the additional housing component. Further, in some embodiments, one or more pieces separate from the housing portion and the additional housing component can be inserted in between those structures (e.g., between the edges of those structures or within the combination passage formed by those structures) to influence air flow.

Many additional embodiments of air cleaners having one or more features differing from those described above are also intended to be encompassed by the present invention. For example, while the channel 126 is above referred to as a "half-duct channel", the above figures make it clear that actually the trough formed within that channel encompasses more than half of the combination passage 148 formed by that channel and the mating channel 127. It should be understood that depending upon the embodiment, such channels can be configured in various additional ways to form a variety of combination passages that are formed to varying degrees by the respective channels. Also for example, while the elbow 125 described above has an outlet orifice that empties toward the side of the air cleaner 100, in alternate embodiments the elbow could be modified so that it directed flow in various other directions (e.g., straight downward). Further for example, the L-shaped fins described above need not be L-shaped in other embodiments and instead could be merely flat fins.

Additionally, while the above description often refers to particular orientations of air cleaners such as the air cleaner 100 and various components thereof, it should be understood that these described orientations are only exemplary and need not be maintained in every embodiment. For example, while the axial center line 199 is described above as being horizontal (or substantially horizontal), in alternate embodiments, the axial center line 199 could be oriented vertically (or substantially vertically). In such embodiments, the orientation of the air inlet opening 129 could be modified from that shown. For example, the rain cover could be oriented at the bottom of the air cleaner and have an air inlet opening that was along the end of the rain cover rather than along its side, so as to be downwardly-facing.

It is specifically intended that the present invention not be limited to the embodiments and illustrations contained herein, but include modified forms of those embodiments including portions of the embodiments and combinations of elements of different embodiments as come within the scope of the following claims.

We claim:

1. An air cleaner comprising:
   a housing portion having an inlet;
   a filter element positioned within the housing portion; and
   a rain cover that extends over the inlet and is coupled to the housing portion so that the inlet opens into the rain cover,
   wherein the rain cover includes an opening along an underside of the rain cover to allow air to enter into the air cleaner,
   wherein at least a preponderance of the rain cover extends substantially no higher than the housing portion;
   wherein the housing portion includes a shaped wall that serves to impart a helical-type motion to at least a portion of the air that entered the air cleaner by way of the opening;
   wherein a seal is formed between the rain cover and the housing portion to prevent a liquid from entering into the inlet by way of a junction between the rain cover and the housing portion; and
   wherein the seal is a labyrinth seal that includes at least one rib that is configured to route water away from the opening.

2. The air cleaner of claim 1, wherein the housing portion is substantially cylindrical and the rain cover is substantially cylindrical, and wherein the rain cover is coupled to the housing portion along an axial end of the housing portion.

3. The air cleaner of claim 2, wherein the rain cover has a first diameter that is substantially equal to a second diameter of the housing portion.

4. The air cleaner of claim 1, wherein the inlet of the housing portion does not protrude outward from a main body portion of the housing portion.

5. The air cleaner of claim 1, wherein a chamber exists within the rain cover by which the unfiltered air is directed to the inlet of the housing portion, and wherein the rain cover serves to limit water ingestion into an engine to which the air cleaner is coupled.

6. The air cleaner of claim 5, wherein at least one of a grid and a grille extends at least one of from the housing portion toward a surface of the rain cover and from the surface of the rain cover toward the housing portion, and wherein the grid or grille at least one of covers the opening and protrudes through the chamber so as to prevent at least some debris, animals or insects from passing into the inlet.

7. The air cleaner of claim 1, wherein the labyrinth seal includes a plurality of axially-extending and circumferentially-extending ribs.

8. The air cleaner of claim 1, wherein the shaped wall has a helical shape and extends at least approximately 90 degrees around a central axis of the air cleaner.

9. The air cleaner of claim 1, wherein the shaped wall has an interior surface and an exterior surface, the interior surface facing an interior cavity of the housing portion and the exterior surface facing the rain cover.

10. The air cleaner of claim 9, wherein the helical-type motion is imparted to the portion of the air both prior to entry of the portion of the air into the inlet and subsequent to the entry of the portion of the air into the inlet.

11. The air cleaner of claim 1, further comprising at least one feature integral with the air cleaner that allows for at least one of the air cleaner to be mounted to an engine, and the air cleaner to be mounted to a carburetor.

12. The air cleaner of claim 1, further comprising a combination passage formed by a combination of a half-duct channel and a mating channel, wherein the combination passage leads from an outlet channel of the housing portion to an outlet of the air cleaner.

13. The air cleaner of claim 12, wherein the channels and outlet are configured to allow the air cleaner to be directly coupled to at least one of a carburetor and an intake manifold without any intermediate air duct.

14. An engine assembly including the air cleaner of claim 1.

\* \* \* \* \*